US007347369B2

(12) United States Patent
Dauw et al.

(10) Patent No.: US 7,347,369 B2
(45) Date of Patent: Mar. 25, 2008

(54) COUNTING PROCESS AND DEVICE FOR PLANAR SUBSTRATES

(75) Inventors: Dirk F. Dauw, Vinzel (CH); Christian Soltermann, Würenlos (CH)

(73) Assignee: KBA-Giori S.A., Lausanne (CH)

( * ) Notice: Subject to any disclaimer, the term of this patent is extended or adjusted under 35 U.S.C. 154(b) by 212 days.

(21) Appl. No.: 10/554,661

(22) PCT Filed: Apr. 16, 2004

(86) PCT No.: PCT/EP2004/004049

§ 371 (c)(1),
(2), (4) Date: Oct. 26, 2005

(87) PCT Pub. No.: WO2004/097732

PCT Pub. Date: Nov. 11, 2004

(65) Prior Publication Data

US 2006/0261148 A1 Nov. 23, 2006

(30) Foreign Application Priority Data

Apr. 30, 2003 (EP) ................................ 03009915

(51) Int. Cl.
*G06K 7/00* (2006.01)

(52) U.S. Cl. ...................................... 235/435; 235/379

(58) Field of Classification Search ................ 235/379, 235/435

See application file for complete search history.

(56) References Cited

U.S. PATENT DOCUMENTS 3,904,189 A 9/1975 Murakami
3,953,022 A 4/1976 Oshima
4,912,317 A * 3/1990 Mohan et al. ........... 250/222.2
5,040,196 A * 8/1991 Woodward ..................... 377/8
5,534,690 A * 7/1996 Goldenberg et al. ..... 250/222.1
5,686,729 A * 11/1997 Bittar et al. ........... 250/559.04
6,137,855 A * 10/2000 Hill et al. ...................... 377/8
6,636,704 B2 * 10/2003 Weaver et al. ................ 399/23

FOREIGN PATENT DOCUMENTS

| | | |
|---|---|---|
| CH | 422 834 | 4/1967 |
| EP | 0 737 936 B1 | 10/1996 |
| EP | 0 743 616 A2 | 11/1996 |
| GB | 744957 | 2/1956 |
| GB | 937463 | 9/1963 |
| GB | 1139292 | 1/1969 |
| RU | 2 007 759 C1 | 2/1994 |
| SU | 859204 | 12/1979 |
| WO | WO 95/00926 A1 | 1/1995 |

* cited by examiner

*Primary Examiner*—Michael G. Lee
*Assistant Examiner*—Tuyen Kim Vo
(74) *Attorney, Agent, or Firm*—Crompton, Seager & Tufte, LLC

(57) ABSTRACT

A process includes the steps of loosening a pack of piled substrates, taking a first image of the piled planar substrates, the image being made of a two-dimensional array of single image detectors arranged in lines and columns, counting the number of edges of substrates detected, statistically treating the result obtained and, based on the statistical treatment, determining whether the counting is accurate.

13 Claims, 3 Drawing Sheets

COUNTING PROCESS AND DEVICE FOR PLANAR SUBSTRATES

FIELD

The present invention concerns a counting process for piled planar substrates, such as sheets, and a device to carry out the process.

BACKGROUND

Methods and machines suitable to count piles of sheets arranged in a stack form for example securities such as banknotes, are known in the art. One of the known devices is disclosed in EP patent application No 0 737 936.

This patent application, the content of which is enclosed by reference in the present application, discloses a counting disk of a sheet counter for sheets arranged in stack form, in particular notes of value, said rotatable counting disk having circumferential sections which are arranged at regular intervals on the border of said disk and have protrusions projecting in the direction of rotation of the disk, and each circumferential section having a counting opening, a pneumatic counting pulse being triggered when said opening is covered by a sheet, having a suction hollow, whose width and depth increase in the direction counter to the direction of rotation of the disk, and having a group of suction openings which are located one behind the other, are arranged in said suction hollow and can be connected intermittently, via suction ducts, to a negative-pressure source, such that, during operation, the abovementioned circumferential sections leaf through all the sheet corners of a sheet stack one after the other, separate these from one another in the process, under the action of suction and deformation, and cause each sheet to be counted. In the known device, the abovementioned suction openings are located in the center of the suction hollow, the sections, opening into the suction openings, of the suction ducts are directed essentially perpendicularly with respect to the disk plane and with respect to the base of the suction hollow, and the suction force acts centrally on the suction hollow and perpendicularly with respect to the base of the suction hollow.

Normally, these counting disks are used on one or two corners of the stack of sheets, thus giving one single counting value or two counting values, e.g. one counting value for each corner. To increase the number of counting values, it is possible to rotate the stack of sheets by 180° and carry out another counting operation on the two other corners of the stack. With such a system, it is hence only possible to obtain a maximum of four counting values for a given stack, in at least two counting operations.

Other known prior art methods and devices include Swiss patent CH 422 834, PCT international application No WO95/00926, GB patents No 931,463, No1,139,292 and No744,957, Russian publications No 859204 and No2007759 C1, and also U.S. Pat. Nos. 3,904,189 and 3,953,022.

All these prior art publications are based on mechanical systems that contact and count the sheets. Usually, as described in EP 0 737 936, the disk travels across the stapled banknotes or securities and at each passage of a successive sheet or banknote, the system will increment a counting value and finally, the end counting value will give the number of sheets/substrate present in the pile. One drawback in such mechanical counting is the fact that the disk, or equivalent means, may damage the substrate being counted.

Further, the system is rather slow (more than 8 seconds for 500 sheets of substrate) and noisy.

Another apparatus and process for counting sheets in a pack is disclosed in EP patent application 0 743 616, the content of which is enclosed by reference in the present application. In this patent application, a linear CCD array is used to create a signal representing a high-resolution one-dimensional line scan of the height of a pack that is positioned between stiffening boards used to increase the rigidity of the pack. Optionally, a compression of the pack is carried out by pressure plate and a piston/clamping assembly before the image is made. The signal corresponding to the image is digitised, stored and then processed by different means (Gaussian filtering, one-dimensional Fast Fourrier Digital Transform etc.). In one specific embodiment, a static two-dimensional CCD array is used to provide a two-dimensional signal and additional signal processing is carried out to translate the signal into a one-dimensional signal along the height of the pack being counted. The two-dimensional CCD array includes rows and columns which are positioned to the pack such that the rows of the array align approximately with the sheets to be counted in the pack. Additional signal processing then averages the values within each row, or samples one column to produce a one-dimensional signal. However, according to this publication, it is preferred to use a linear CCD array camera also for costs reasons and for speed of processing reasons.

SUMMARY

It is therefore an aim of the present invention to improve the known counting process and systems.

More specifically, an aim of the invention is to provide a counting process that avoids contacting the substrate to be counted.

Another aim of the present invention is to provide a process and a system that are able to count piled substrates faster and more accurately than the known process and systems.

Another aim of the present invention is to provide a statistical process for counting piled substrates.

A further aim of the invention is to detect folded sheets of substrate in a pile.

A further aim of the present invention is to provide a device suitable for carrying out the process.

These aims are met by the process and device defined in the claims.

BRIEF DESCRIPTION

The foregoing and other objects and advantages of the invention will become more apparent when taken in conjunction with the following description of several embodiments and drawings of the invention.

DETAILED DESCRIPTION

Figure 1:
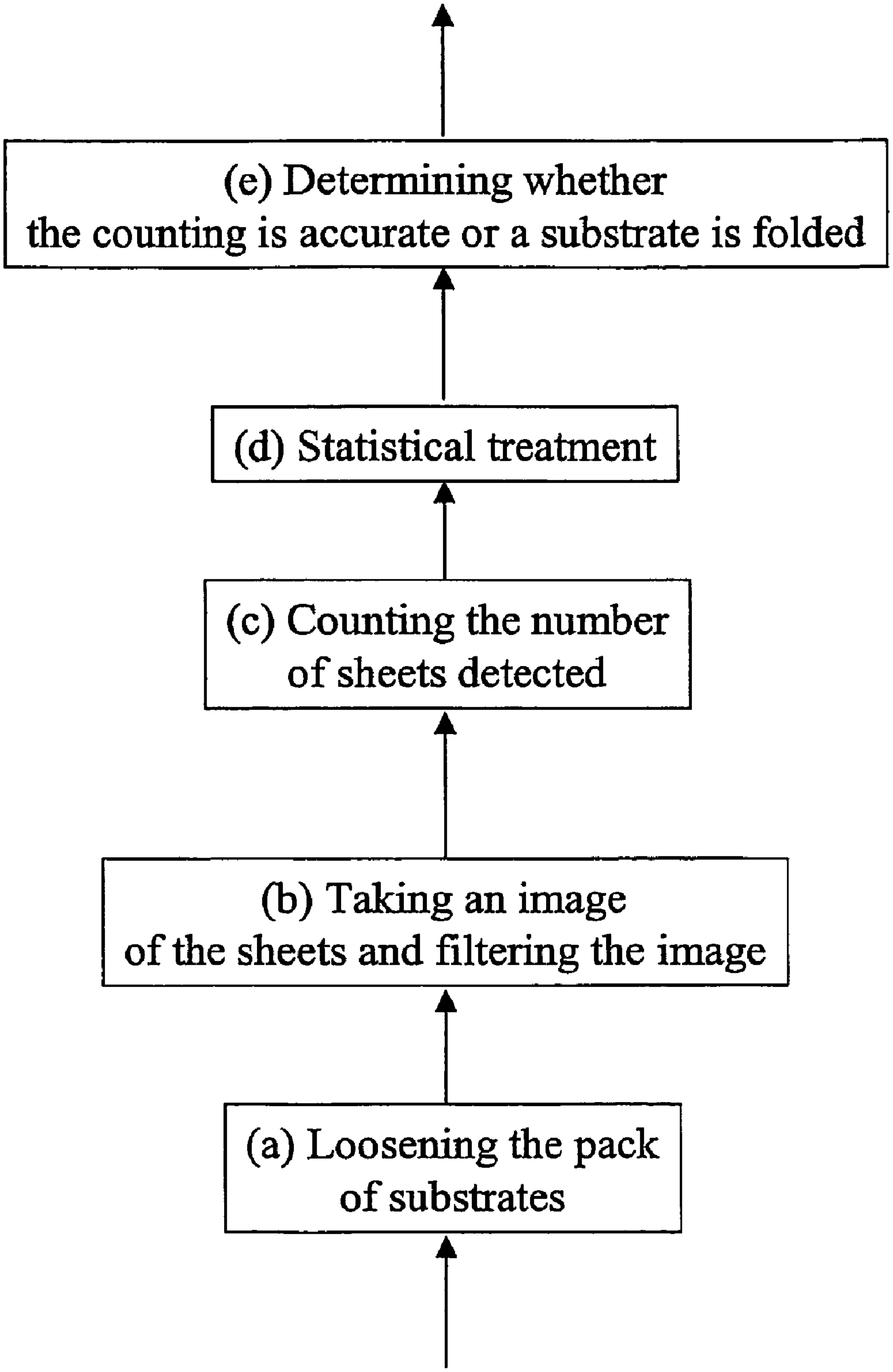
FIG. 1 shows a general block-diagram of the process according to the invention.
Figure 2:
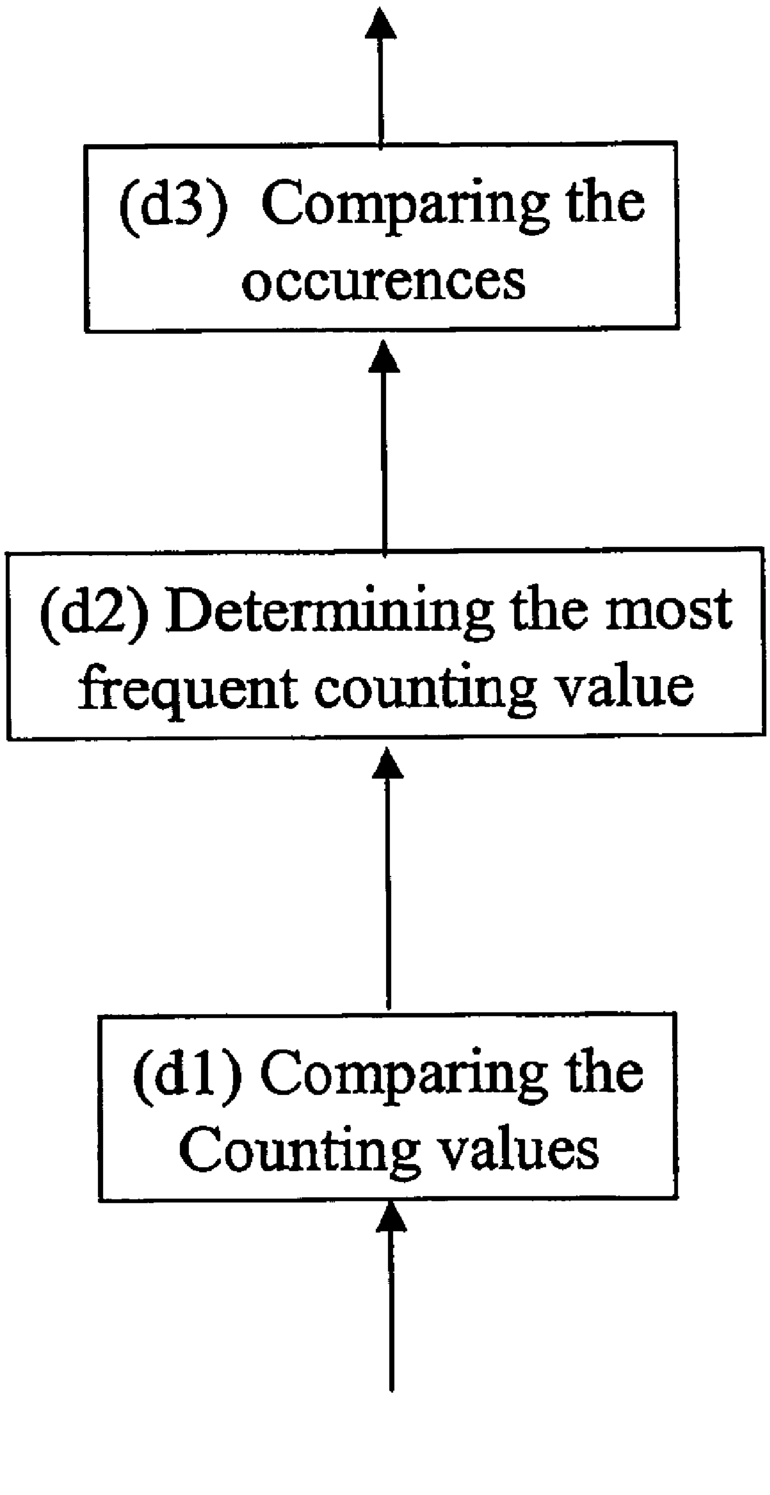
FIG. 2 shows a block-diagram of a statistical treatment according to the invention.

The process of the invention is suitable for counting planar substrates, such as sheets of securities or banknotes, checks, cards and other similar objects, piled in a pack and placed in a pouch and comprises the first step of loosening the pack of piled substrates. This loosening is preferably carried out with air under pressure and allows to separate the piled substrates and improve the quality of the counting. Of course, depending on the thickness and/or the material of the substrates, the loosening step could be avoided and is therefore optional.

Then, an image of the edges of the piled substrates is taken by imaging means on a counting side of the pack. These imaging means will be described further in detail and may include a CCD camera and treatment means.

Using a CCD camera allows to form a two-dimensional array of single image detectors, for example pixels, arranged in lines and columns in which one can detect the presence of substrate edges.

As a convention, one defines that the lines of the array are horizontal and the columns are vertical. Therefore, in each column of pixel of the array, one will see the height of the pile of substrates.

In addition, the image obtained is preferably filtered to remove the noise that is usually present in this type of images. The filtering operation is known per se in the state of the art.

According to the process of the invention, for each column of single image detectors of the array, one then counts the number of sheets of substrates detected in each line of pixel (which have the shape of a segment of line) in order finally to obtain a counting value for each column, said value being the number sheets of substrates detected as segments of lines in each pixel column.

Therefore, one obtains a set of counting values, the number of which is equal to the number of columns in the array. Typically, CCD arrays have 512×512 pixels, or 1024×1024 pixels or even 2000×2000 pixels, and one will obtain, for example 512 counting values, respectively 1024 or 2000 counting values for the entire array.

The set of counting values is then statistically analysed to determine which value is obtained and how often. For example, if the pack of substrate contains theoretically 500 piled sheets of substrates, the correct counting value (500) should appear a certain number of times, for example $N_{500}$ times and other counting values such as 499, 498, 497, 501, 502, 503 will also appear a certain number of times, for example $N_{499}$, $N_{498}$, $N_{497}$, $N_{501}$, $N_{502}$, $N_{503}$ times.

In other words, each counting value $N_{cv}$ will appear a certain number of times, the "number of times" being equal to the number of columns in which a counting value is determined. One then analyses the values $N_{cv}$ obtained and attributes the value 1,0 to the value $N_{cv}$ occurring the most frequently. For all the other values $N_{cv}$, the percentage of occurrence of each value with respect to the value occurring the most frequently is calculated.

As an example, considering that the pile being counted contains 500 sheets of substrate, in an array of 2000×2000, one could obtain 1990 times the value 500 ($N_{500}$=1990), then 3 times the value 499 ($N_{499}$=3), 1 time the value 498 ($N_{498}$=1), 5 times the value 497 ($N_{497}$=5), and 1 time the value 501 ($N_{501}$=1). The most frequently occurring value is accordingly 500, and the other value occurs with the following percentages: 499 0,15%; 498 0,05%; 497 0,25%; 501 0,05%.

Once this statistic has been done, it is possible then to decide whether the counting has been accurate or not under predetermined rules. The predetermined rules may be decided by the user, for example, the relative percentage of the occurrences of the other counting values can be set to a certain limit and if this limit is exceeded, the counting is considered inaccurate. Preferably, the limit is set at 10%, therefore, if a counting value occurs more than 10% times relatively to the most frequent value, the counting is regarded as inaccurate.

Of course, another value may be chosen for this limit. In addition, if the most frequently occurring value is not equal to the expected theoretical value (for example 500), the counting must also be considered inaccurate.

One may distinguish three different possibilities of result of this statistical analysis.

In the first case, the counting value obtained the most frequently is the expected value, and the occurrence of all other obtained values is below the set limit (for example 10% as mentioned above), therefore the counting can be regarded as correct.

In the second case, the counting value obtained the most frequently is the expected value, but the occurrence of one or several other obtained values is over the set limit (for example 10% as mentioned above), and in this case the counting appears correct (the proper value is obtained the most frequently) but should be repeated to check for accuracy. This situation can occur when a sheet is partially folded and is counted on one side of the counting side of the pack, and not on the other side.

In the third case, the counting value obtained the most frequently is not the expected value, and the occurrence of the other obtained values is over or below the set limit (for example 10% as mentioned above). In this case the counting is not correct and the pile has not the proper number of substrates, or a substrate is folded, or the counting is not correct and the counting machine has to be adjusted.

As a second embodiment of this process, it is possible to make a second image of the counting side of the pack and then to treat this second image with the process according to the invention described above in order to verify the first counting operation. This second image can be taken and analysed only if the counting operation in the first image has not given the expected result (see second and third case indicated above), or even is the first counting operation has given the correct result, as a verification step of the obtained result.

This second image may be taken on the same counting side as the first image, or on another counting side of the pack, with the pack being displaced or not.

As a further development of the process described above, it could be envisaged to take images of at least two sides of a pile and to detect the presence of a folded substrate or torn substrate by comparing the respective counting values. Such a comparison can be made by known electronic treatment means and the analysis of the counting values obtained for each counting side could even help to identify in which position the substrate is folded or torn. For this purpose, it is preferred to take images of the four sides of a pile.

As can be understood from this description, a key advantage of the process according to the invention is that it is possible to obtain N counting values in one single counting operation, whereas the known counting devices are only able to provide one or two counting values in one counting operation. One can then carry out a proper statistical analysis of N counting values obtained, rather than only compare a maximum of four counting values as obtained with the known devices. With the known devices, it is indeed necessary to carry out N counting operations if one wishes to obtain N counting values. The process according to the invention allows therefore an important saving of time in the counting process and also at the same time a more precise counting process per se with a statistical analysis carried out on high numbers (N counting values) rather than one, two, three or four counting values.

Figure 3:
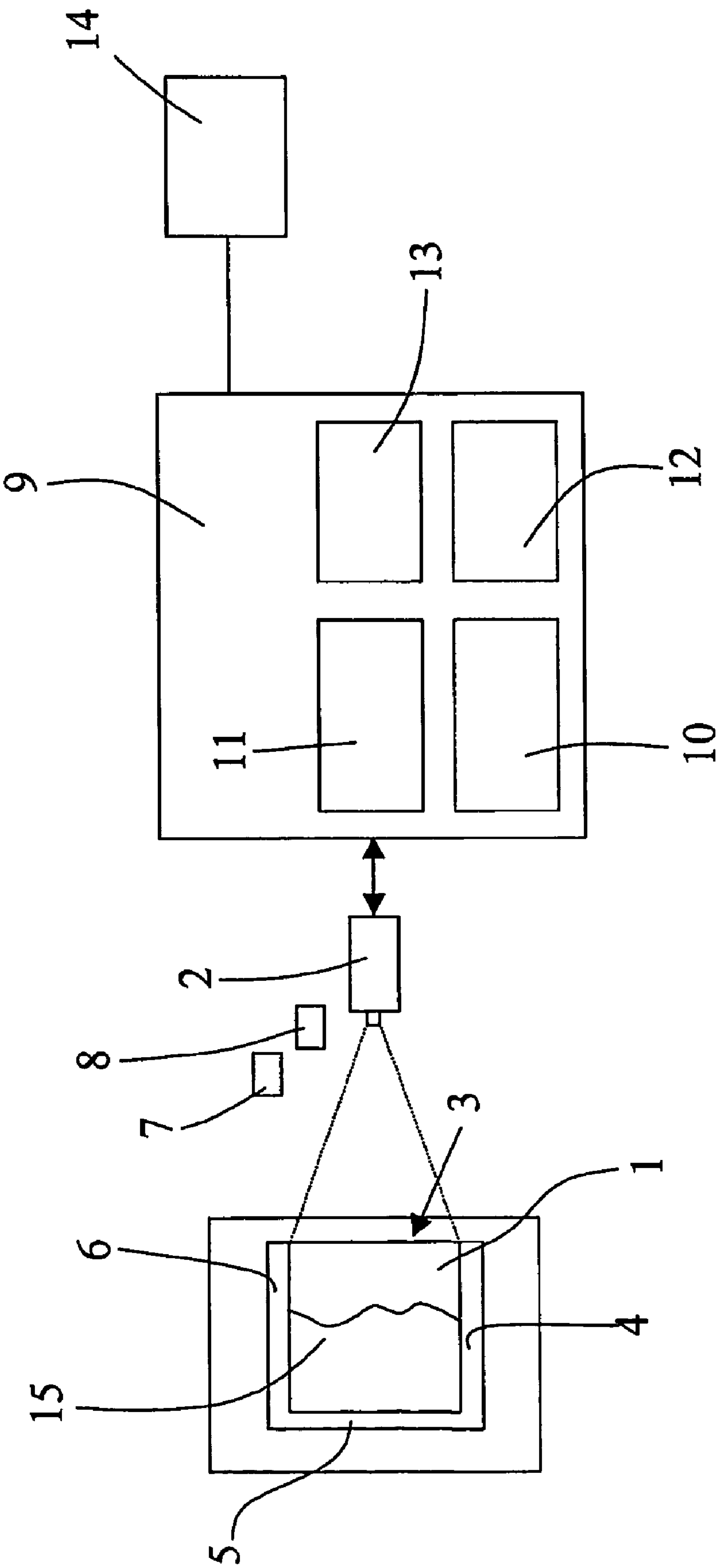
FIG. 3 shows the top view of an embodiment of a device suitable for carrying out the process of the invention.

An embodiment of a device suitable for carrying out the process of the invention is now described with reference to FIG. 3.

In this device, packs of planar substrates 1, for example packs of securities or similar objects, are brought in front of an imaging device, for example a CCD camera 2, in such a manner that the camera 2 is able to take a picture of a counting side 3 of the pack 1. Preferably, each pack 1 is surrounded by three walls 4, 5, 6 in order to facilitate the loosening operation which is carried out for example by a jet of air under pressure sent by blowing means 7. This loosening operation thus slightly separates the individual piled substrates and thus improves the quality of the image used for counting. In order to maintain the pack 1 in this loosened position during a certain time, each is placed in a pouch 15 (schematically represented in FIG. 3) which is open on the counting side of the pack 1. The air used for the loosening operation is therefore trapped in the pouch 15 and the pack remains in a loose configuration. The pouch may be in a synthetic material or paper material, or any other suitable material.

To further improve the system, it is possible to add illuminating means, for example a LED 8 or other equivalent means, which will increase the quality of the image.

Once the image has been taken, it undergoes the statistical treatment described above with appropriate treatment means. These means are described in a more detailed manner with reference to FIG. 3. The CCD camera 2 is linked to a computer device 9, such as a PC or similar device, which comprises at least a microprocessor 10, filtering means 11, input/output interfaces 12 and memory means 13 to store the information. One of the programs stored in the computer 9 is able to carry out the process according to the invention, in particular by calculating the counting values as defined above and determining their respective frequency. The result of the counting process may then be outputted on an output means 14, for example a computer screen or a printer or even be used to determine the further treatment applied to a specific pile of substrates, for example repeat the counting in case of an inaccurate counting, further processing of the counted pile if the counting operation gives a correct result, specific processing of the counted pile if the counting is not correct etc.

In order to take a picture of a second (or further) counting side of the packs, additional means have to be provided for by which either the packs are turned or the walls 4, 5, 6 displaced to allow the counting on said other counting side.

The embodiments of the invention described in the present specification are given as illustrative examples and must not be interpreted in a limiting manner. Other variants and equivalent solutions are possible within the scope of the appended claims.

The invention claimed is:

1. Process for counting planar substrates, such as sheets of securities or banknotes, checks, cards and other similar objects, piled in a pack and comprising the following steps:

(a) loosening the pack of piled substrates;

(b) taking a first image of the edges of the piled planar substrates on a first counting side of said pack, said image being made of a two-dimensional array of single image detectors arranged in lines and columns;

(c) for each column of single image detectors of said two-dimensional array, counting the number of edges of substrates detected in each line of single image detectors to obtain a counting value for each column;

(d) statistically treating the result obtained from step (c) for determining which counting values are obtained and how often, said statistical treatment comprising the following steps:

(d1) comparing the counting values obtained in each column;

(d2) setting the result value of the counting to the most frequently obtained value in step (c); and (d3) for each other counting value of number of edges obtained in each other column, comparing the number of occurrences of said other value with respect to the result value obtained in step (d2);

said process further comprising the following step:

(e) based on the statistical treatment, determining whether the counting is accurate, said counting being determined to be inaccurate:

if, in step (d2), the result value is different than a predetermined value; and/or if, in step (d3), each other counting values obtained occurs more than a predetermined percentage with respect to the most frequently obtained value.

2. Process as claimed in claim 1, wherein step (a) is made by air under pressure.

3. Process as claimed in claim 1, wherein said single image detectors are pixels.

4. Process as claimed in claim 1, wherein said predetermined percentage is 10 percent.

5. Process as claimed in claim 1, wherein a second image is taken of said piled planar substrates, said image undergoing steps (b) through (e) of claim 1.

6. Process as claimed in claim 5, wherein said second image is taken on a second counting side of the pile.

7. Process as claimed in claim 6, further comprising the step of comparing the respective counting values determined from each image to detect the presence of a folded or torn substrate.

8. Process as claimed in claim 7, wherein images of all four sides of said pile are taken and undergo steps (b) through (e) of claim 1 to identify in which position the substrate is folded or torn.

9. Device for carrying out the counting process as defined in claim 1, whereby said device comprises at least a loosening device for loosening piles of substrates, an imaging device for taking an image of a counting side of said pile, treatment means to apply said counting process to said image, said treatment means being adapted to perform said counting step (c), said statistical treatment step (d) and said counting accuracy determination step (e), and output means to output the result of the counting process.

10. Device as claimed in claim 9, wherein said loosening device is an air blowing means.

11. Device as claimed in claim 9, wherein said imaging device is a CCD camera.

12. Device as claimed in claim 9, wherein the device further comprises illuminating means.

13. Device as claimed in claim 9, wherein said treatment means comprise at least a computer.

* * * * *

UNITED STATES PATENT AND TRADEMARK OFFICE

CERTIFICATE OF CORRECTION

PATENT NO. : 7,347,369 B2
APPLICATION NO. : 10/554661
DATED : March 25, 2008
INVENTOR(S) : Dirk F. Dauw et al.

It is certified that error appears in the above-identified patent and that said Letters Patent is hereby corrected as shown below:

Column 1
Line 55, delete "GB patents No 931,463," and insert therefor -- "GB patents No. 937,463, --.

Signed and Sealed this

Twenty-fourth Day of June, 2008

JON W. DUDAS
*Director of the United States Patent and Trademark Office*